United States Patent [19]

Adachi

[11] Patent Number: 4,861,171

[45] Date of Patent: Aug. 29, 1989

[54] COMPOSITE CYLINDRICAL ROLLER BEARING ASSEMBLY

[75] Inventor: Takehiro Adachi, Osaka, Japan

[73] Assignee: Koyo Seiko Co., Ltd., Osaka, Japan

[21] Appl. No.: 278,173

[22] Filed: Dec. 1, 1988

[30] Foreign Application Priority Data

Dec. 23, 1987 [JP] Japan .............................. 62-195170[U]

[51] Int. Cl.[4] ........................................... F16C 19/38
[52] U.S. Cl. ................................... 384/455; 384/594;
384/620; 384/621
[58] Field of Search ............... 384/455, 594, 620, 621,
384/622, 623, 570, 505

[56] References Cited

U.S. PATENT DOCUMENTS

| | | | |
|---|---|---|---|
| 1,436,283 | 11/1922 | O'Connor | 384/594 |
| 3,652,141 | 3/1972 | Hüsten et al. | 384/455 |
| 3,802,755 | 4/1974 | Schluter et al. | 384/455 |
| 4,573,811 | 3/1986 | Andree et al. | 384/622 |

Primary Examiner—Lenard A. Footland
Attorney, Agent, or Firm—Wenderoth, Lind & Ponack

[57] ABSTRACT

A composite cylindrical roller bearing assembly including an inner ring having an annular projection on its outer peripheral side, an outer ring having an annular recess to receive the annular projection on its inner peripheral side, upper and lower cylindrical thrust rollers held by upper and lower retainers and disposed in upper and lower spaces formed above and below the projection in the recess, cylindrical radial rollers held by a retainer and disposed in an annular space between peripheral surfaces of the recess and the projection, and an annular gear to be meshed with an external gear. The inner ring is divisibly composed of first, second and third annular inner ring sections each of which is divisibly composed of two generally semicircular parts. One of the above annular inner ring sections has projections defining teeth of the annular gear on its inner peripheral side. The outer ring is also divisibly composed of first and second annular outer ring sections each of which is divisibly composed of two generally semicircular parts. The retainers for the thrust rollers and radial rollers each are divisibly composed of three arc-like parts. Thereby this bearing assembly is easy to carry or treat on the occasions of transportations and repairs no matter how big the bearing assembly is, and any scaling-up as desired is possible.

9 Claims, 4 Drawing Sheets

COMPOSITE CYLINDRICAL ROLLER BEARING ASSEMBLY

BACKGROUND OF THE INVENTION

This invention relates to a composite cylindrical roller bearing having both cylindrical thrust rollers and radial rollers, and more particularly to a composite cylindrical roller bearing which is used as a bearing for a cutter head of a tunnel excavating machine or a bearing for a turn- table of a very large scaled building machine.

One of such composite cylindrical roller bearings which are known is shown in FIG. 4. In this bearing, an outer ring 101 thereof is provided with an annular recess in its inner peripheral surface and with axially through holes 105 at its outer peripheral portion, and is fixed to a static member (not shown) by means of bolts (not shown) to be inserted into the holes 105. On the other hand, an inner ring 106 located inside of the outer ring has an annular projection to be fitted in the recess of the outer ring on its outer peripheral surface and also has a driving gear 107 on its inner peripheral surface 106a. The inner ring 106 is screwed on a table (not shown), so that a lower surface 106b of the inner ring is fixed to the table by means of bolts to be fitted in screw holes 117 formed therein.

There are provided a retainer 111 and thrust rollers 114 held by the retainer 111 at a portion defined by a lower surface 109b of the projection of the inner ring 106 and a surface 109a, of the outer ring, facing the surface 109b. Similarly, there are provided a retainer 112 and thrust rollers 115 held by the retainer 112 at a portion defined by an upper surface 110b of the projection of the inner ring 106 and another surface 110a, of the outer ring 101, facing the surface 110b. On the other hand, radial rollers 119 held by a further retainer 118 are disposed at a portion defined by an outer peripheral surface 116b of the projection of the inner ring 106 and a bottom surface 116a of the recess of the outer ring 101.

The inner ring is rotated inside the fixed outer ring 101 along with the table fixed thereto by a rotation force which is externally applied through the driving gear 107.

Seals 122 and 123 are retained by respective annular seal holders 120 and 121 which are respectively fixed to the outer ring 101 and inner ring 106 by bolts 125 and 126.

The outer ring 101 is composed of upper and lower outer ring portion 102 and 103 and is divided into those two pieces in the dismantling.

By the way, a recent trend toward a further increase in size in the large-sized tunnel excavating machines and building machines requires further scaling-up of actually large-sized bearings.

The above described prior art composite cylindrical roller bearing is composed of the upper outer ring portion 102, lower outer ring portion 103, inner ring 106 and retainers 111, 112 and 118, each of which components is formed of an undivisible piece, so that those members are very big and heavy, and this causes difficulty in transporting and repairing. Furthermore, there is a serious problem that size and weight of such bearing components are limited from the point of view of treatment convenience, and this makes it impossible to produce bearings of extraordinarily superlarge size.

SUMMARY OF THE INVENTION

Therefore, a primary object of the present invention is to provide a composite cylindrical roller bearing assembly easy to treat in the transportation and repairs and free from restriction on its size and weight, in which components such as inner and outer rings, retainers, etc. are all divisible into several pieces and a gear is formed in either the outer ring or the inner ring.

In order to accomplish the object, a composite cylindrical roller bearing assembly of the present invention comprises an inner ring which has one of an annular projection and an annular recess provided on an outer peripheral side thereof, and can be recomposably divided into at least first and second inner ring sections by an imaginary division plane perpendicular to a rotating axis, the first and second inner ring sections each also being capable of being recomposably divided into at least two parts by imaginary division planes including the axis; an outer ring which has the other of the annular projection and recess to loosely engage with the one of the annular projection and recess of the inner ring on an inner peripheral side thereof, and can be recomposably divided into at least first and second outer ring sections by an imaginary division plane perpendicular to the axis, the first and second outer ring sections each also being capable of being recomposably divided into at least two parts by imaginary division planes including the axis; upper and lower cylindrical thrust rollers disposed at regular intervals in a circumferential direction in upper and lower annular spaces formed between opposite surfaces of the loosely engaged annular projection and recess; upper and lower retainers to hold the upper and lower cylindrical thrust rollers, each being capable of being recomposably divided into at least two parts by imaginary division planes including the axis; cylindrical radial rollers disposed at regular intervals in a circumferential direction in an annular space formed between peripheral surfaces of the loosely engaged annular projection and recess; a retainer to hold the cylindrical radial rollers, being capable of being recomposably divided into at least two parts by imaginary division planes including the axis; and an annular gear which is formed either on an inner peripheral side of the inner ring or on an outer peripheral side of the outer ring to be meshed with an external gear, being capable of being recomposably divided into at least two parts by imaginary division planes including the axis.

Preferably, interfaces between the parts of the first outer ring section are different in phase from interfaces between the parts of the second outer ring section. And interfaces between the parts of the first inner ring section are different in phase from interfaces between the parts of the second inner ring section.

Furthermore, it is preferable that the annular gear is divided at bottom portions between teeth thereof.

With the above construction, the composite cylindrical roller bearing assembly operates as follows:

The inner ring is divided into at least the first and second inner ring sections by the imaginary division plane perpendicular to the axis, and further, the first and second inner ring sections each are divided into at least two parts of a generally semicircular shape by respective imaginary division planes including the axis, where the imaginary division planes for the first inner ring section are different in phase from the ones for the second inner ring sections when the first and second inner ring sections are united. At this time, if the gear is provided on an inner peripheral side of one of the inner ring sections, the gear is also divided into at least two parts at the same time by the division planes for the either ring section which cross the bottom portion of the gear.

Similarly to the inner ring, the outer ring is divided into at least the first and second outer ring sections by the imaginary division plane perpendicular to the axis, and further, the first and second outer ring sections each are divided into at least two generally semicircular parts by respective imaginary division planes including the axis, where the imaginary division planes for the first outer ring section are different in phase from the ones for the second outer ring sections when the first and second outer ring sections are united. At this time, if the gear is provided on an outer peripheral side of one of the outer ring sections, the gear is also divided into at least two parts simultaneously with the one outer ring section by the common division planes which cross the bottom portion of the gear.

Similarly, the retainers for the thrust rollers and the one for the radial rollers are also divided into at least two parts by the division planes including the axis.

To sum up, the composite cylindrical roller bearing assembly of the present invention is divided into a plurality of component parts of a size convenient to treat and carry on the occasions such as transportation, repairs, and the like. Due to this feature, it is possible to produce a very supersized bearings free from limitations of size and weight.

Furthermore, since the assemblage of the first and second outer ring sections is carried out with the respective division surfaces thereof located at different positions from each other, conjunction portions of the first outer ring section and ones of the second outer ring section are not brought into contact with the same thrust rollers or the radial rollers simultaneously, so that the bearing assembly of this invention can be rotated smoothly.

Moreover, since the gear is divided at the bottom portion thereof between the teeth, no influences are given on the gear motion and transmission of driving force between the gear and another driving gear to mesh with the gear.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
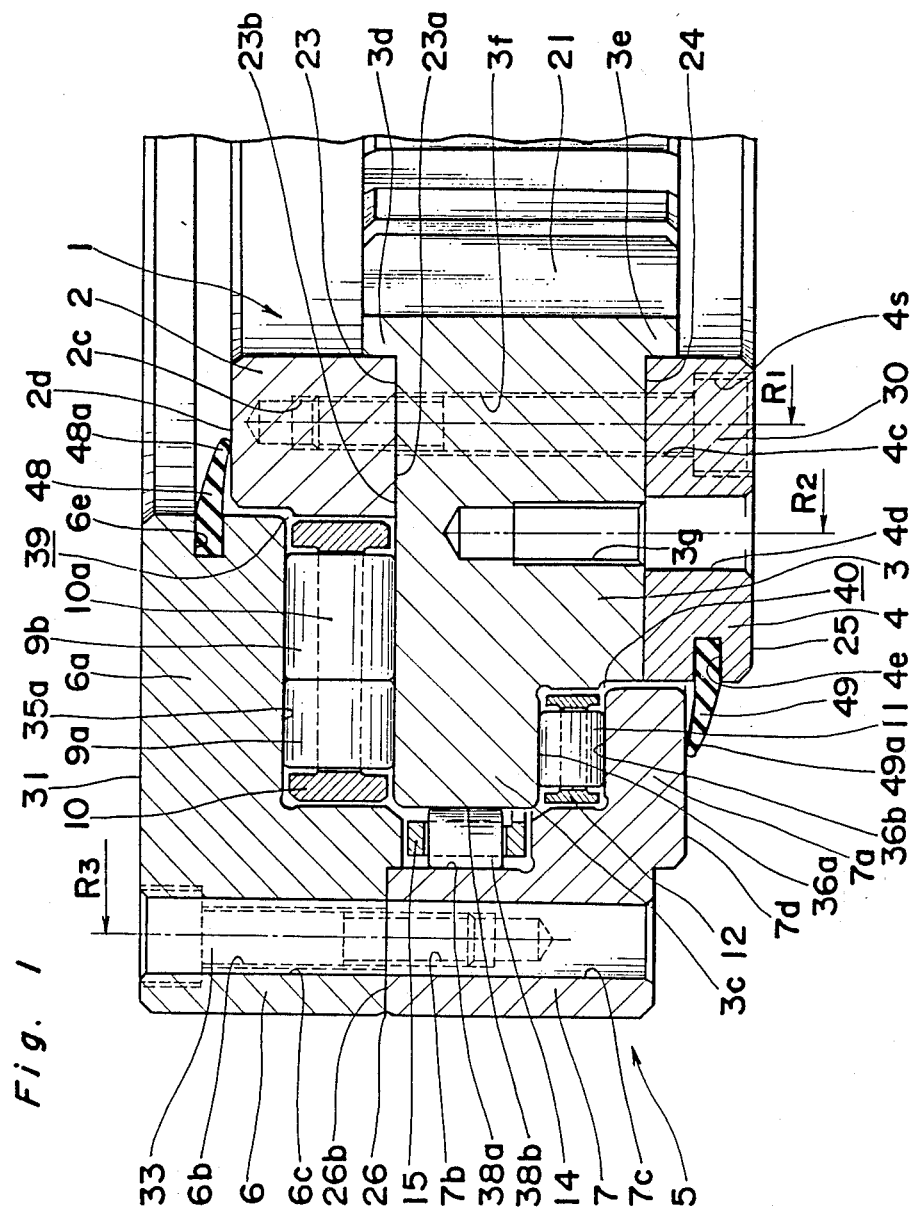
FIG. 1 is a cross-sectional view of a composite cylindrical roller bearing assembly as an example of the present invention.

Referring now to FIG. 1, reference numeral 1 designates an inner ring which is decomposably assembled of a first inner ring section 2, a second inner ring section 3 and a third inner ring section 4. The first, second and third inner ring sections 2, 3 and 4 are separable from each other by planes 23 and 24 which are perpendicular to the axial direction and parallel to each other. Reference numeral 5 designates an outer ring which is decomposably assembled of first and second outer ring sections 6 and 7 which are divided by a plane 26 perpendicular to the axial direction.

The first inner ring section 2 is an annular member with a generally rectangular cross section, the second inner ring section 3 is also an annular member with a generally L-shaped cross section, which is provided with a projection 3c at an outer peripheral portion and is also provided with an upper flange 3d projecting upwardly from its upper surface and a lower flange 3e projecting downwardly from its lower surface at an inner peripheral portion, and the third inner ring section 4 is also an annular member with a generally rectangular cross section.

Figure 2:
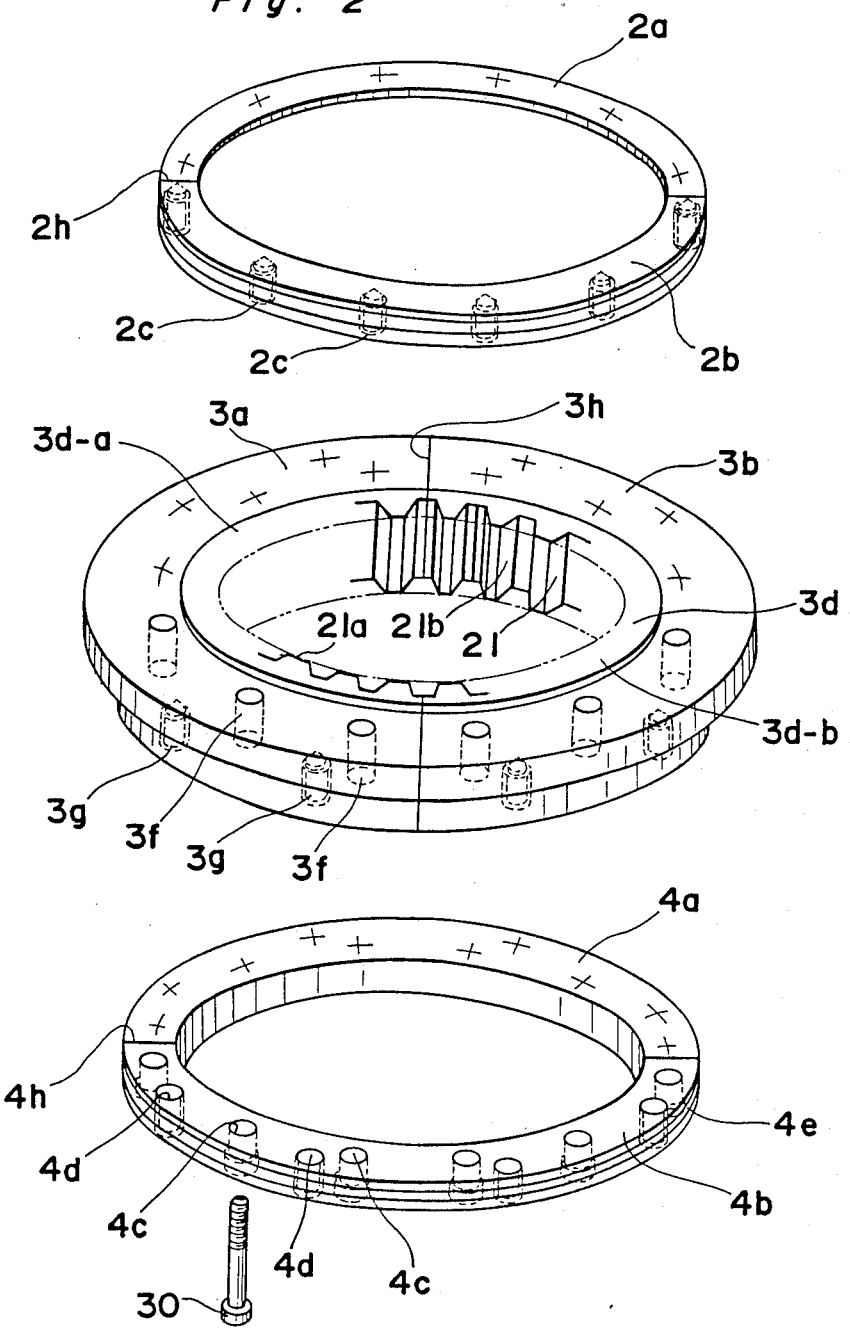
FIG. 2 is a view illustrating the assemblage of an inner ring according to an embodiment of the present invention.

As shown in FIGS. 1 and 2, a plurality of female screws 2c are provided in the first inner ring section 2 at regular intervals along an imaginary circle of a radius of R1 on a lower surface side of the first inner ring section 2. Thread portions of the female screws 2c reach the middle of the height of the first inner ring section 2. The second inner ring section 3 has axially directed through holes 3f at positions corresponding to those of the female screws 2c of the first inner ring section 2. The second inner ring section 3 also has female screws 3g regularly spaced from each other along an imaginary circle of a radius of R2 larger than R1 on a lower surface side thereof. Thread portions of the female screws 3g reach the middle of the height of the second inner ring section 3. A gear 21 having an even number of teeth is formed on the inner side of the second inner ring section 3 in one piece. The third inner ring section 4 has on a lower surface side thereof stepped holes 4c at positions corresponding to those of the female screws 2c of the first inner ring section 2 and through holes 3f of the second inner ring section 3 along an imaginary circle of the radius of R1 and also has through holes 4d regularly spaced and corresponding to the female screws 3g along an imaginary circle of the radius of R2. An annular groove 4e for receiving a seal is formed on an outer peripheral surface of the third inner ring section 4.

As shown in FIG. 2, the first, second and third inner ring sections 2, 3 and 4 are divisible into a couple of equal semicircular pieces, respectively. As a result, the inner ring 1 is divisible into six pieces, that is, two pieces 2a and 2b of the first inner ring section 2, two pieces 3a and 3b of the second inner ring section 3, and two pieces 4a and 4b of the third inner ring section 4. A division plane 3h for the second inner ring section 3 divides the gear 21 into first and second gear sections 21a and 21b at the bottom thereof between the teeth.

The combination or assemblage of the six parts 2a and 2b; 3a and 3b; and 4a and 4b into a unit of the inner ring 1 is carried out in the following manner as shown in FIG. 2.

First, the semicircular parts 3a and 3b of the second inner ring section 3 are arranged in such a manner that the corresponding division surfaces 3h are brought into contact with each other. At this time, the gear 21 is formed of the first gear section 21a on the inner peripheral side of the part 3a and the second gear section 21b on the inner peripheral side of the part 3b. Similarly, a first upper flange section 3d-a of the part 3a and a second upper flange section 3d-b of the part 3b are assembled into the upper flange 3d, and a first lower flange section (not shown in FIG. 2) of the part 3a and a second (not shown in FIG. 2) of the part 3b are assembled into the lower flange 3e.

Next, the semicircular parts 2a and 2b of the first inner ring section 2 are placed on the upper surface of the second inner ring section 3 so assembled with division surfaces 2h thereof being brought into contact with each other in such a manner that the phase of the division surfaces 2h is different from that of the division surfaces 3h by 90° and that the inner peripheral surface of the first inner ring section 2 is in contact with an outer peripheral surface of the upper flange 3d, the center of the first inner ring section 2 coinciding with that of the second inner ring section 3. At this time, the female screws 2c provided in the first inner ring section 2 along the imaginary circle of the radius of R1 and the corresponding through hole 3f of the second inner ring section 3 are aligned in the axial direction.

Similarly to the first inner ring section 2, the semicircular parts 4a and 4b of the third inner ring section 4 are placed on the lower surface of the second inner ring section 3 with division surfaces 4h thereof being brought into contact with each other in such a manner that the phase of the division surfaces 4h is different from that of the division surfaces 3h by 90°. At this time, the stepped holes 4c of the third inner ring section 4 provided along the imaginary circle of the radius of R1 and the corresponding female screws 2c provided in the first inner ring section 2 and the corresponding through holes 3f of the second inner ring section 3 are aligned in the axial direction. Similarly, the through holes 4d of the third inner ring section 4 provided along the imaginary circle of the radius of R2 and the corresponding female screws 3g of the second inner ring section 3 are aligned in the same direction.

Finally, fixing bolts 30 get inserted in the stepped holes 4c through the corresponding through holes 3f to the female screws 2c and engaged with the female screws 2c, respectively. The bolts 30 screw up the first, second and third inner ring sections 2, 3 and 4 so that the first and third inner ring sections 2 and 4 press the second inner ring section 4 in between. In this way, the six inner ring component parts are assembled into the inner ring 1 of one unit. At this time, heads of the bolts 30 are contained respectively in step portions 4s of the stepped holes 4c, so that the heads do not appear outside of the lower surface of the inner ring 1 and this allows another member such as a table to be fixed to the lower surface without any problem.

The inner ring 1 assembled in the above mentioned way has a generally T-shaped cross-section, having the projection 3c at the outer peripheral portion. The inner ring 1 is fixed to a member (not shown) by bolts (not shown) which are inserted in the respective through holes 4d provided along the circle of the radius of R2 and which are engaged with the respective female screws 3g in alignment with the through holes 4d.

Figure 3:
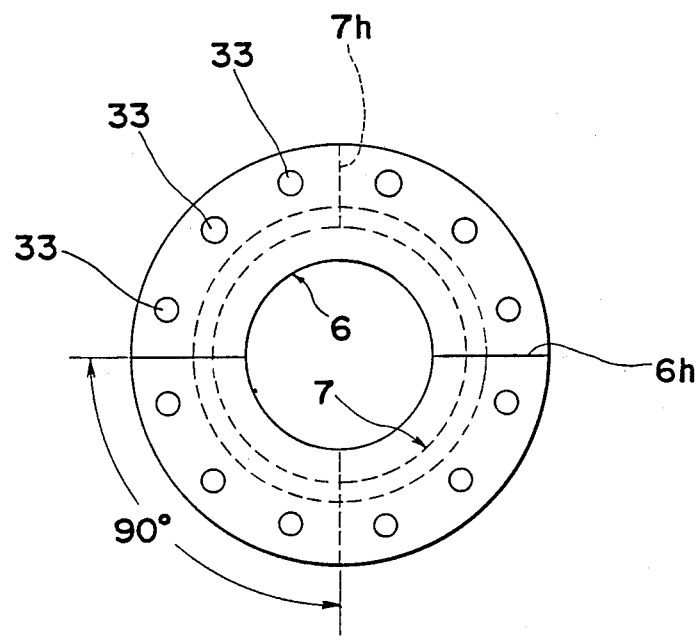
FIG. 3 is a view illustrating the assemblage of an outer ring according to the embodiment of the present invention.
Figure 4:
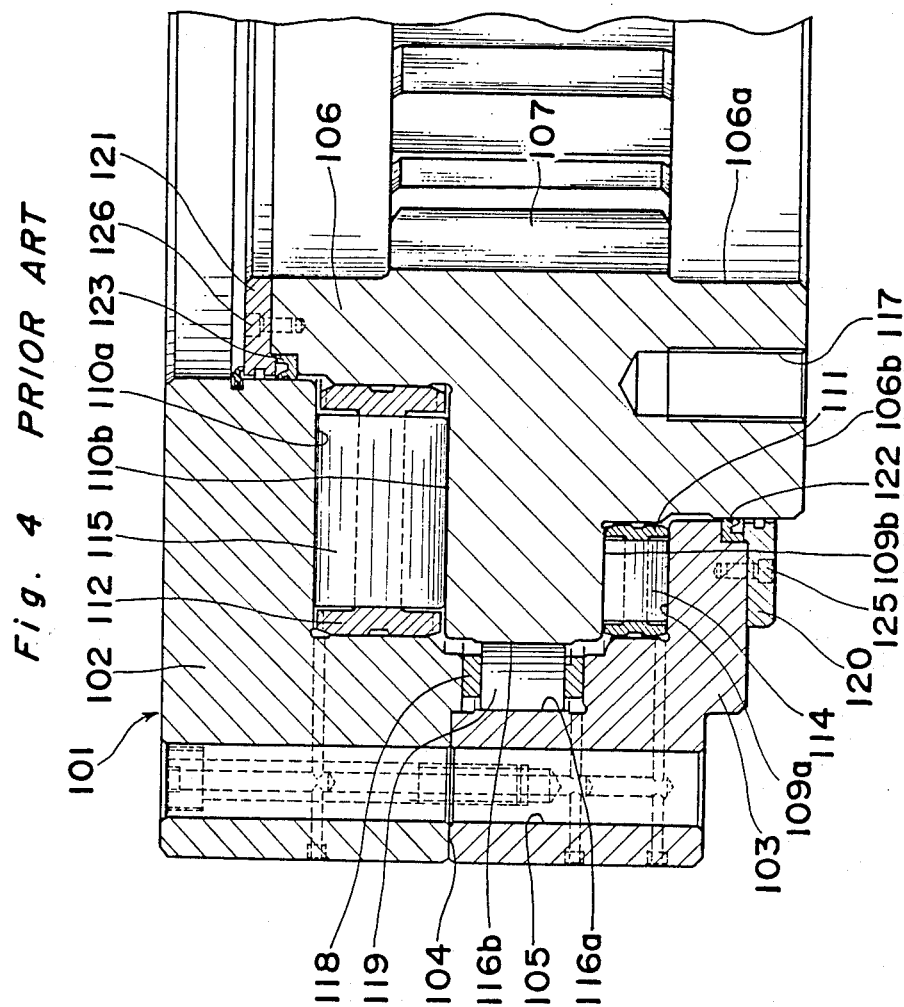
FIG. 4 is a cross-sectional view of a prior art composite cylindrical roller bearing.

The first outer ring section 6 is an annular member having a generally L-shaped cross section with a projection 6a on its inner peripheral side, and similarly, the second outer ring section 7 is an annular member having a generally L-shaped cross section with a projection 7a on its inner peripheral side. As shown in FIGS. 1 and 3, the first outer ring section 6 has stepped holes 6b formed at regular intervals along a circle of a radius of R3 on the upper surface side. There are also provided through holes 6c in the first outer ring section 6, which are regularly spaced along the same circle of the radius of R3, but at different positions from those of the stepped holes 6b. An inner surface of the first outer ring section 6 at the projection 6a has an annular groove 6e running in the circumferential direction to receive a seal 48, similarly to the outer peripheral surface of the third inner ring section 4. Along an imaginary circle of the radius of R3 on a division plane or upper surface 26b of the second outer ring section 7 are provided female screws 7b which correspond to the stepped holes 6b of the first outer ring section 6, and through holes 7c which correspond to the through holes 6c of the first outer ring section 6. Respective thread portions of the female screws 7b reach the middle of a height of the second outer ring section 7. The first and second outer ring sections 6 and 7 each are divisible into two equal parts of a semicircular shape by a bisector extending in the diametric direction. Accordingly, the entire outer ring 5 is divisible into four pieces totally.

The assemblage or union of the two semicircular parts of the first outer ring section 6 and the ones of the second outer ring section 7 into the outer ring unit 5 is performed similarly to that of the inner ring 1. That is, as shown in FIG. 3, the two parts of the first outer ring section 6 are arranged on the two parts of the second outer ring section 7 with respective division surfaces 6h and 7h being brought into contact with the corresponding division surfaces 6h and 7h in such a way that the division planes 6h of the first outer ring section 6 are different by 90° in phase from the ones of the second outer ring section 7, and then, the first and second outer ring sections 6 and 7 so placed are united to each other by fixing bolts 33 inserted into the respective stepped holes 6b and engaged with the female screws 7b.

The outer ring 5 formed in the above way is generally U-shaped in its cross section, having an annular recess to fit the projection 3c of the inner ring 1, as shown in FIG. 1. A turntable is fixed to an upper surface 31 of the outer ring 5 by bolts (not shown) to be inserted in the axially aligned through holes 6c and 7c provided at the outer peripheral portion of the outer ring 5.

There is provided an annular retainer 10 to hold cylindrical thrust rollers at a space between a surface 35a defining a lower surface of the projection 6a of the first outer ring section 6 and the upper surface 23b of the projection 3c of the inner ring 1. The cylindrical thrust rollers consist of cylindrical thrust rollers 9a and 9b, and a pair of cylindrical thrust rollers 9a and 9b is rotatably contained in each space formed by radially directed and regularly spaced partitions 10a of the retainer 10. The retainer 10 is divisible into three generally arc-shaped equal parts. Another retainer 12 is provided in an annular space between a lower surface 36a of the projection 3c of the inner ring 1 and an upper surface 36b of the projection 7a of the second outer ring section 7. This retainer 12 holds thrust rollers 11 regularly spaced from each other by partitions of the retainer 12 so that the thrust rollers 11 can be rotated. This retainer 12 is also divisible into three generally arc-shaped equal parts similarly to the retainer 10.

The thrust rollers 9a and 9b allow the outer ring 5 loaded with a work to be rotatable around the fixed inner ring 1 with little friction, receiving thrust load. The reason for using the thrust rollers 9a in combination with the other thrust rollers 9b in this embodiment is as follows: Generally speaking, in order to receive a heavy thrust load, scaling up of thrust rollers is required. Such scaling up of thrust rollers, however, causes a big difference in a rotation speed of thrust rollers between on an outer peripheral side and an inner peripheral side, and this causes a slip of the thrust rollers on the outer peripheral side or the inner peripheral side. To overcome this problem, thrust rollers are divided into inner-side rollers 9a and outer-side rollers 9b in this embodiment so that the inner and outer-side rollers 9a and 9b can be rotated at different speeds from each other. And at the same time, a heavy thrust load is received by both thrust rollers of a supersize as a whole.

The further thrust rollers 11 serve to receive moment which is generated in the outer ring 5 due to inequal thrust loads.

A still further retainer 15 to hold radial rollers 14 contained therein at regular intervals in the circumferential direction is disposed in a space formed between a peripheral surface 38a defining part of a bottom portion of the recess of the outer ring 5 and a peripheral surface 38b of the projection 3c of the inner ring 1. This retainer 15 is also divisible or decomposable into three equal parts of a generally arc-like shape, similarly to the other retainers 10 and 11.

As referred to before, annular seals 49 and 48 of an elastic material are fitted in the respective annular grooves 6e and 4e formed in the first outer ring section 6 and the third inner ring section 4, respectively, so as to prevent the intrusion of foreign matters such as water, mud, and the like into spaces 40 and 39. Tips 49a and 48a of these seals 49 and 48 are in a close contact with the upper surface 2d of the first inner ring section 2 and to the lower surface 7d of the second outer ring section 7 because of elasticity thereof.

As described above, in this embodiment, the inner ring 1 is divisible into the first, second and third inner ring sections 2, 3 and 4, each of the sections further into two parts, the outer ring 5 is divisible into the first and second outer ring sections 6 and 7, each of the sections further into two parts, the retainers 10 and 12 for the thrust rollers into three parts, and the other retainer 15 for the radial rollers into three parts as well. Accordingly, the composite cylindrical roller bearing assembly of this embodiment is easy to treat in the transportation and repairs, and furthermore, it is possible to make extraordinarily supersized bearings of this type free from the restriction on the size and weight.

Furthermore, the assemblage of the first and second outer ring sections 6 and 7 is carried out with the respective division surfaces 6h and 7h thereof located at different positions from each other. Accordingly, conjunction portions 6h of the first outer ring section 6 and ones 7h of the second outer ring section 7 are not brought into contact with the same thrust rollers 9a, 9b and 11 or the radial rollers 14 simultaneously, so that the bearing of this embodiment can be rotated smoothly.

Furthermore, the gear 21 is halved at the bottom portion thereof between the teeth. Therefore, no influences are given on the gear motion and transmission of driving force between the gear and another driving gear (not shown) to mesh with the gear.

In this embodiment, the inner ring 1 is provided with the annular projection and the outer ring 5 is provided with the annular recess to receive the projection of the inner ring 1, but alternatively, the inner ring may be provided with a recess at the outer peripheral portion and the outer ring may be provided with a projection to fit in the recess at the inner peripheral portion. The number of divisions of the bearing components such as the inner and outer rings and retainers for the thrust and radial rollers is not limited to the above specific numbers and such bearing components may be divided into an optimum number of pieces in consideration of factors such as capacity of the transportation vehicles, operation efficiency, size and weight of a complete bearing, etc. Further, an outer gear may be provided in the outer ring 5 as a gear, instead of the gear 21 of the inner ring 1.

The invention being thus described, it will be obvious that the same may be varied in many ways. Such variation are not to be regarded as a departure from the spirit and scope of the invention, and all such modifications as would be obvious to one skilled in the art are intended to be included within the scope of the following claims.

What is claimed is:

1. A composite cylindrical roller bearing assembly comprising:

an inner ring which has one of an annular projection and an annular recess provided on an outer peripheral side thereof, and can be recomposably divided into at least first and second inner ring sections by an imaginary division plane perpendicular to a rotating axis, the first and second inner ring sections each also being capable of being recomposably divided into at least two parts by imaginary division planes including the axis;

an outer ring which has the other of the annular projection and recess to loosely engage with the one of the annular projection and recess of the inner ring on an inner peripheral side thereof, and can be recomposably divided into at least first and second outer ring sections by an imaginary division plane perpendicular to the axis, the first and second outer ring sections each also being capable of being recomposably divided into at least two parts by imaginary division planes including the axis;

upper and lower cylindrical thrust rollers disposed at regular intervals in a circumferential direction in upper and lower annular spaces formed between opposite surfaces of the loosely engaged annular projection and recess;

upper and lower retainers to hold the upper and lower cylindrical thrust rollers, each being capable of being recomposably divided into at least two parts by imaginary division planes including the axis;

cylindrical radial rollers disposed at regular intervals in a circumferential direction in an annular space formed between peripheral surfaces of the loosely engaged annular projection and recess;

a retainer to hold the cylindrical radial rollers, being capable of being recomposably divided into at least two parts by imaginary division planes including the axis; and an annular gear which is formed either on an inner peripheral side of the inner ring or on an outer peripheral side of the outer ring to be meshed with an external gear, being capable of being recomposably divided into at least two parts by imaginary division planes including the axis.

2. A composite cylindrical roller bearing assembly as claimed in claim 1, wherein the inner ring has the annular projection and the outer ring has the annular recess to receive the annular projection of the inner ring.

3. A composite cylindrical roller bearing assembly as claimed in claim 1, wherein interfaces between the parts of the first outer ring section are different in phase from interfaces between the parts of the second outer ring section.

4. A composite cylindrical roller bearing assembly as claimed in claim 1, wherein the annular gear is divided at bottom portions between teeth thereof.

5. A composite cylindrical roller bearing assembly as claimed in claim 3, wherein the annular gear is divided at bottom portions between teeth thereof.

6. A composite cylindrical roller bearing assembly as claimed in claim 1, wherein interfaces between the parts of the first inner ring section are different in phase from interfaces between the parts of the second inner ring section.

7. A composite cylindrical roller bearing assembly as claimed in claim 1, wherein the inner ring has a plurality of projections to define teeth of the annular gear on the inner peripheral side of one of the at least first and second inner ring sections and the one of the at least first and second inner ring sections can be divided by imaginary division planes including the axis and intersecting bottom portions between the teeth of the annular gear.

8. A composite cylindrical roller bearing assembly as claimed in claim 1, further comprising seal members provided between the inner and outer rings for preventing intrusion of foreign matter into internal spaces.

9. A composite cylindrical roller bearing assembly as claimed in claim 1, wherein the thrust rollers held by at least one of the upper and lower retainers are composed of inner-side rollers and outer-side rollers.

* * * * *